United States Patent
Sakano et al.

(10) Patent No.: US 11,332,574 B2
(45) Date of Patent: May 17, 2022

(54) SEALANT FILM AND METHOD FOR PRODUCING SAME

(71) Applicant: KURARAY CO., LTD., Kurashiki (JP)

(72) Inventors: Takeshi Sakano, Kurashiki (JP); Soichiro Tanabe, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 237 days.

(21) Appl. No.: 16/314,119

(22) PCT Filed: Jul. 13, 2017

(86) PCT No.: PCT/JP2017/025497
§ 371 (c)(1),
(2) Date: Dec. 28, 2018

(87) PCT Pub. No.: WO2018/012572
PCT Pub. Date: Jan. 18, 2018

(65) Prior Publication Data
US 2019/0225745 A1    Jul. 25, 2019

(30) Foreign Application Priority Data

Jul. 15, 2016   (JP) .............................. JP2016-140832

(51) Int. Cl.
| | |
|---|---|
| *C08G 63/676* | (2006.01) |
| *C08J 5/18* | (2006.01) |
| *C08G 63/16* | (2006.01) |
| *B29C 48/00* | (2019.01) |
| *B29C 55/00* | (2006.01) |
| *B29C 55/02* | (2006.01) |
| *C09K 3/10* | (2006.01) |
| *B29L 7/00* | (2006.01) |

(52) U.S. Cl.
CPC ........ *C08G 63/676* (2013.01); *B29C 48/0018* (2019.02); *B29C 48/022* (2019.02); *B29C 55/005* (2013.01); *B29C 55/02* (2013.01); *C08G 63/16* (2013.01); *C08J 5/18* (2013.01); *C09K 3/10* (2013.01); *B29K 2023/06* (2013.01); *B29L 2007/008* (2013.01); *C08G 2190/00* (2013.01); *C08G 2250/00* (2013.01); *C08J 2367/06* (2013.01); *C09K 2200/0655* (2013.01)

(58) Field of Classification Search
CPC ... B29C 55/005; B29C 55/04; B29K 2067/00; B29K 2995/0053; B29K 2995/0077; B32B 2309/105; B32B 2439/70; B32B 27/32; B32B 27/36; C08J 2300/00; C08J 2367/02; C08J 5/18

See application file for complete search history.

(56) References Cited

U.S. PATENT DOCUMENTS

| | | |
|---|---|---|
| 2009/0124763 A1 | 5/2009 | Matsuda et al. |
| 2011/0071238 A1 | 3/2011 | Bastioli et al. |
| 2012/0258299 A1 | 10/2012 | Matsuda et al. |
| 2013/0011631 A1 | 1/2013 | Sakellarides et al. |
| 2013/0171397 A1 | 7/2013 | Ghosh et al. |
| 2014/0205786 A1 | 7/2014 | Nederberg et al. |
| 2014/0336349 A1 | 11/2014 | Sipos et al. |
| 2015/0001213 A1 | 1/2015 | Nederberg et al. |
| 2015/0057424 A1 | 2/2015 | Jacquel et al. |
| 2015/0141584 A1 | 5/2015 | Saywell et al. |
| 2015/0343746 A1* | 12/2015 | Bhattacharjee ......... B32B 27/08 428/212 |
| 2016/0108171 A1* | 4/2016 | Haruta .................... B32B 27/32 428/35.2 |
| 2016/0200862 A1 | 7/2016 | Bastioli et al. |
| 2016/0237206 A1 | 8/2016 | Nederberg et al. |
| 2017/0297256 A1 | 10/2017 | Kolstad et al. |

FOREIGN PATENT DOCUMENTS

| | | | |
|---|---|---|---|
| JP | 2007-146153 | A | 6/2007 |
| JP | 2008-291244 | A | 12/2008 |
| JP | 2011-520005 | A | 7/2011 |
| JP | 2012-229395 | A | 11/2012 |
| JP | 2014-118457 | A | 6/2014 |
| JP | 2014-530948 | A | 11/2014 |
| JP | 2015-506389 | A | 3/2015 |
| JP | 2015-507684 | A | 3/2015 |
| JP | 2015-511662 | A | 4/2015 |
| JP | 2015-514151 | A | 5/2015 |

(Continued)

OTHER PUBLICATIONS

Writ Opinion for EP Application 178277695 2—PCT/JP2017/025497 (Year: 2020).*
Matthew J. Friday "A Comparison of Tension Test Data Using ASTM D 638 and ISO 527", 200 (Year: 2000).*
Extended European Search Report dated Jan. 30, 2020, in Patent Application No. 17827695.2, 8 pages.

(Continued)

*Primary Examiner* — Ling Siu Choi
*Assistant Examiner* — Gennadiy Mesh
(74) *Attorney, Agent, or Firm* — Oblon, McClelland, Maier & Neustadt, L.L.P.

(57) ABSTRACT

Disclosed is a sealant film including at least a layer formed of a polyester as a superficial layer, in which the polyester contains 20 to 50 mol % of a 2,5-furandicarboxylic acid unit, 18 to 49.5 mol % of at least one diol unit selected from the group consisting of an ethylene glycol unit, a 1,3-propanediol unit, and a 1,4-butanediol unit, and 0.5 to 2.5 mol % of a diethylene glycol unit, the sealant film has a crystallinity of less than 14%, and the sealant film is a stretched film that exhibits a shrinkage ratio of 6% or more in a maximum shrinkage direction upon being allowed to stand at 125° C. for 20 seconds. This provides a sealant film superior in mechanical properties, especially tensile elongation, and also superior in heat sealability, non-adsorptivity, and gas barrier properties.

6 Claims, No Drawings

(56) References Cited

FOREIGN PATENT DOCUMENTS

| WO | WO 2009/135921 A1 | 11/2009 | |
|----|-------------------|---------|---|
| WO | WO 2013/062408 A1 | 5/2013 | |
| WO | WO 2013/097013 A1 | 7/2013 | |
| WO | WO 2013/103574 A1 | 7/2013 | |
| WO | WO 2013/149221 A1 | 10/2013 | |
| WO | WO 2016/032330 A1 | 3/2016 | |
| WO | WO-2016032330 A1 * | 3/2016 | ............ B32B 27/32 |

OTHER PUBLICATIONS

Reichert, M. et al., "Thermoformen Teil 1: Analytik von Thermoform-Folien", XP055660101, Sep. 19, 2012 Retrieved from the Internet: URL:https://www.innoform-coaching.de/blog/2012/09/19/thermoformen-teil-1-analytik-von-thermoform-folien/, 17 pages.
International Search Report dated Sep. 19, 2017 in PCT/JP2017/025497 filed on Jul. 13, 2017.

* cited by examiner

SEALANT FILM AND METHOD FOR PRODUCING SAME

TECHNICAL FIELD

The present invention relates to a sealant film made of a polyester comprising a 2,5-furandicarboxylic acid unit and at least one diol unit selected from the group consisting of an ethylene glycol unit, a 1,3-propanediol unit, and a 1,4-butanediol unit as major constituents. The present invention also relates to a method for producing the same.

BACKGROUND ART

A sealant film is widely used in a packaging material for foods, beverages, chemicals, cosmetics, and medical instruments, and the like. The sealant film is disposed as an innermost layer or the like of a packaging material and it can seal the packaging material by being heat-sealed. Examples of resins known to be used as the sealant film include polyolefins such as polyethylene and polypropylene, an ionomer, and an ethylene-methyl methacrylate copolymer. However, since organic compounds tend to be adsorbed to these resins, odorous components and contents are adsorbed to a sealant film made of the resins, which sometimes causes problems.

Incidentally, polyesters such as polyethylene terephthalate (hereinafter sometimes abbreviated as PET) are known to be resins to which organic compounds are less prone to be adsorbed and which are superior in non-adsorptivity. Polyesters are also superior in properties including mechanical properties, gas barrier properties, flavor barrier properties, and transparency. Furthermore, polyesters are less concerned about residual monomers or harmful additives when being formed into molded articles, and therefore are superior in sanitation property and safety.

In recent years, attention has been paid to polyesters including, as a raw material, furandicarboxylic acid that can be produced from biomass. For example, Patent Literature 1 discloses a polymer compound having a structural unit represented by the following formula. Patent Literature 1 describes that the polymer compound is superior in moldability and mechanical strength (flexural strength) and has physical properties high enough to withstand the specifications of optical instruments, bottles, and housing materials. However, Patent Literature 1 has no description about use of the polymer compound as a sealant film, and the tensile elongation of that polymer compound is not necessarily satisfactory and some improvement is required.

[Chemical formula 1]

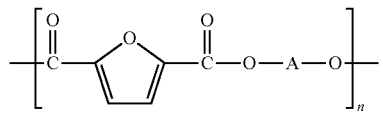

In the formula, A represents an optionally substituted aromatic hydrocarbon group, an optionally substituted aliphatic hydrocarbon group, or an alicyclic hydrocarbon group that need not to be substituted, and n is a degree of polymerization of 185 or more and 600 or less.

PRIOR ART DOCUMENTS

Patent Documents

Patent document 1: JP 2007-146153 A

SUMMARY OF THE INVENTION

Problems to be Solved by the Invention

The present invention has been made in order to solve the above problems and an object thereof is to provide a sealant film superior in mechanical properties, especially tensile elongation, and also superior in heat sealability, non-adsorptivity, and gas barrier properties.

Means for Solving the Problems

The above problems can be solved by providing a sealant film comprising at least a layer formed of a polyester as a superficial layer, wherein the polyester comprises 20 to 50 mol % of a 2,5-furandicarboxylic acid unit, 18 to 49.5 mol % of at least one diol unit selected from the group consisting of an ethylene glycol unit, a 1,3-propanediol unit, and a 1,4-butanediol unit, and 0.5 to 2.5 mol % of a diethylene glycol unit; the sealant film has a crystallinity of less than 14%; and the sealant film is a stretched film that exhibits a shrinkage ratio of 6% or more in a maximum shrinkage direction upon being allowed to stand at 125° C. for 20 seconds.

At this time, it is preferable that the polyester further comprises 0.01 to 30 mol % of another comonomer unit having 5 or more carbon atoms, that the sealant film has a uniaxial stretching ratio of 1.1 to 4.5, and that the sealant film has an area stretching ratio of 1.1 to 9.0.

The sealant film that exhibits a tensile elongation of 130% or more as measured by performing a tensile test under a condition defined by a temperature of 23° C., a relative humidity of 65%, and a tensile rate of 50 mm/min is a preferred embodiment of the present invention.

The above problems can be also solved by providing a method for producing the sealant film, the method comprising: extrusion-molding the polyester to obtain a film; and subsequently uniaxially stretching the film.

The above problems can be also solved by providing a method for producing the sealant film, the method comprising: extrusion-molding the polyester to obtain a film; and subsequently biaxially stretching the film.

Effects of the Invention

The sealant film of the present invention is superior in mechanical properties, especially tensile elongation, and also superior in heat sealability, non-adsorptivity, and gas barrier properties. Therefore, such a sealant film is suitably used as an innermost layer of various packaging materials, and the like. Further, the production method of the present invention can easily provide such a sealant film obtained.

MODES FOR CARRYING OUT THE INVENTION

The sealant film of the present invention is a sealant film comprising at least a layer formed of a polyester as a superficial layer, wherein the polyester comprises 20 to 50 mol % of a 2,5-furandicarboxylic acid unit, 18 to 49.5 mol % of at least one diol unit selected from the group consisting of an ethylene glycol unit, a 1,3-propanediol unit, and a 1,4-butanediol unit, and 0.5 to 2.5 mol % of a diethylene glycol unit, the sealant film has a crystallinity of less than 14%, and the sealant film is a stretched film that exhibits a shrinkage ratio of 6% or more in a maximum shrinkage direction upon being allowed to stand at 125° C. for 20 seconds. The present inventors have shown that the sealant film that satisfies such configurations is superior in mechanical properties, especially tensile elongation, while maintaining superior heat sealability and superior gas barrier properties.

The content of the 2,5-furandicarboxylic acid unit in the polyester is 20 to 50 mol %, and if the content is less than this range, oxygen barrier properties and water vapor barrier properties deteriorate. The content of the 2,5-furandicarboxylic acid unit is preferably 25 mol % or more, more preferably 30 mol % or more, and even more preferably 35 mol % or more.

The diol unit in the polyester is at least one selected from the group consisting of an ethylene glycol unit, a 1,3-propanediol unit, and a 1,4-butanediol unit. The content of the diol unit in the polyester is 18 to 49.5 mol %, and if the content is less than this range, deterioration in heat resistance due to decrease in glass transition temperature or deterioration in gas barrier properties will be problematic. The content of the diol unit is preferably 25 mol % or more, more preferably 28 mol % or more, and even more preferably 30 mol % or more.

The content of the diethylene glycol unit in the polyester is 0.5 to 2.5 mol %. Usually, the polyester contains units as by-product formed by dimerization of ethylene glycol during the polycondensation reaction. The content of the diethylene glycol unit is preferably 2 mol % or less.

The polyester preferably comprises another comonomer unit other than the 2,5-furandicarboxylic acid unit, the at least one diol unit selected from the group consisting of an ethylene glycol unit, a 1,3-propanediol unit, and a 1,4-butanediol unit, and the diethylene glycol unit in an amount of 0.01 to 30 mol %. When the polyester comprises the other comonomer unit in an amount of 0.01 mol % or more, the crystallinity and melting point of the polyester can be lowered, heat sealability can be enhanced, or extrusion film formability can be improved. The content of the other comonomer unit is preferably 0.03 mol % or more. On the other hand, when the content of the other comonomer unit is more than 30 mol %, heat resistance or gas barrier properties will be insufficient. When the polyester further comprises the other comonomer unit, the total of the contents of the 2,5-furandicarboxylic acid unit and the other comonomer unit is preferably 30 to 80 mol %. The total of the contents is more preferably 75 mol % or less. The other comonomer unit preferably has 5 or more carbon atoms.

When the other comonomer unit has less than 5 carbon atoms, the raw material comonomer thereof has a low boiling point and is volatilized during its polycondensation reaction, and therefore it may be difficult to recover ethylene glycol, and the like. The fact that the number of the carbon atoms is 5 or more effectively lowers the crystallinity of the polyester. The upper limit of the number of the carbon atoms is not particularly limited, but the number of the carbon atoms is usually less than 50 or less. The other comonomer unit contained in the polyester may be either of one type or two or more types in combination.

The other comonomer unit to be mainly used is a bifunctional compound unit such as a dicarboxylic acid unit other than the 2,5-furandicarboxylic acid unit, a diol unit other than the ethylene glycol unit, the 1,3-propanediol unit, the 1,4-butanediol unit, and the diethylene glycol unit, or a hydroxycarboxylic acid unit. As the bifunctional compound unit to be used as the other comonomer unit, a dicarboxylic acid unit other than the 2,5-furandicarboxylic acid unit, or a diol unit other than the ethylene glycol unit, the 1,3-propanediol unit, the 1,4-butanediol unit, and the diethylene glycol unit is preferred. Moreover, a polyfunctional compound unit having 3 or more carboxyl groups or hydroxyl groups, or a monofunctional compound unit that is a monocarboxylic acid unit or a monoalcohol unit can be used together with the bifunctional compound unit.

Examples of the dicarboxylic acid unit to be used as the other comonomer unit include units derived from aliphatic dicarboxylic acids such as glutaric acid, adipic acid, azelaic acid, sebacic acid, and dimer acid, and their ester-forming derivatives; alicyclic dicarboxylic acids such as cyclohexane dicarboxylic acid, norbornene dicarboxylic acid, and tricyclodecane dicarboxylic acid, and their ester-forming derivatives; and aromatic dicarboxylic acids such as terephthalic acid, isophthalic acid, phthalic acid, biphenyl dicarboxylic acid, diphenyl ether dicarboxylic acid, diphenylsulfone dicarboxylic acid, diphenyl ketone dicarboxylic acid, sodium sulfoisopthalate, 2,6-naphthalene dicarboxylic acid, 1,4-naphthalene dicarboxylic acid, and 2,7-naphthalene dicarboxylic acid, and their ester-forming derivatives. The dimer acid is a dicarboxylic acid obtained by dimerizing an unsaturated fatty acid. Examples of the unsaturated fatty acid include unsaturated fatty acids having 18 carbon atoms, such as linoleic acid, linolenic acid, and oleic acid. The dimer acid may be a dimer acid that is not hydrogenated or a dimer acid that is hydrogenated, but the latter is preferable which is less prone to be colored during polymerization. The dicarboxylic acid unit to be used as the other comonomer unit is preferably at least one selected from the group consisting of a terephthalic acid unit, an isophthalic acid unit, a sebacic acid unit, a dimer acid unit, and an adipic acid unit, more preferably at least one selected from the group consisting of a terephthalic acid unit, an isophthalic acid unit, a sebacic acid unit, and a dimer acid unit, and even more preferably at least one selected from the group consisting of a terephthalic acid unit and an isophthalic acid unit.

Examples of the diol unit to be used as the other comonomer unit include units derived from aliphatic diols such as 1,5-pentanediol, neopentyl glycol, 1,6-hexanediol, and methylpentanediol; alicyclic diols such as cyclohexanedimethanol, cyclooctanedimethanol, norbornenedimethanol, and tricyclodecanedimethanol; and isosorbide. Examples of the methylpentanediol include 3-methyl-1,5-pentanediol and 2-methyl-1,5-pentanediol. Examples of the cyclohexanedimethanol include 1,2-cyclohexanedimethanol, 1,3-cyclohexanedimethanol, and 1,4-cyclohexanedimethanol. A unit derived from a diol in which one or more ethylene oxide molecules are added to each of two hydroxyl groups of an aromatic diol can be also employed. One example thereof is a unit derived from a bisphenol A-ethylene oxide adduct in which 1 to 8 molecules of ethylene oxide are added to each of two phenolic hydroxyl groups of bisphenol A. Especially, the diol unit to be used as the other comonomer unit is preferably at least one selected from the group consisting of a 3-methyl-1,5-pentanediol unit, a unit derived from a bisphenol A-ethylene oxide adduct, a 1,4-cyclohexane dimethanol unit, a cyclooctane dimethanol unit, and an isosorbide unit, more preferably at least one selected from the group consisting of a 3-methyl-1,5-pentanediol unit, a unit derived from a bisphenol A -ethylene oxide adduct, and a 1,4-cyclohexane dimethanol unit, and even more preferably a 3-methyl-1,5-pentanediol unit or a unit derived from a bisphenol A -ethylene oxide adduct.

Examples of the hydroxycarboxylic acid unit to be used as the other comonomer unit include aliphatic hydroxycarboxylic acids such as 10-hydroxyoctadacanoic acid or their ester-forming derivatives; alicyclic hydroxycarboxylic acids such as hydroxymethylcyclohexane carboxylic acid, hydroxymethylnorbornene carboxylic acid, and hydroxymethyltricyclodecane carboxylic acid or their ester-forming derivatives; and aromatic hydroxycarboxylic acids such as hydroxybenzoic acid, hydroxytoluic acid, hydroxynaphthoic acid, 3-(hydroxyphenyl)propionic acid, hydroxyphenylacetic acid, and 3-hydroxy-3-phenylpropionic acid or their ester-forming derivatives.

Especially, the bifunctional compound unit to be used as the other comonomer unit is preferably at least one selected from the group consisting of the terephthalic acid unit, the isophthalic acid unit, the 3-methyl-1,5-pentanediol unit, the sebacic acid unit, the unit derived from a bisphenol A-ethylene oxide adduct, the dimer acid unit, the 1,4-cyclohexane dimethanol unit, the cyclooctane dimethanol unit, the isosorbide unit, and the adipic acid unit, more preferably at least one selected from the group consisting of the terephthalic acid unit, the isophthalic acid unit, the 3-methyl-1,5-pentanediol unit, the sebacic acid unit, the unit derived from a bisphenol A-ethylene oxide adduct, the dimer acid unit, and the 1,4-cyclohexane dimethanol unit, even more preferably at least one selected from the group consisting of the terephthalic acid unit, the isophthalic acid unit, the 3-methyl-1,5-pentanediol unit, the sebacic acid unit, the unit derived from a bisphenol A-ethylene oxide adduct, and the dimer acid unit, and particularly preferably at least one selected from the group consisting of the terephthalic acid unit and the isophthalic acid unit.

Examples of the polyfunctional compound unit having 3 or more carboxyl groups or hydroxyl groups to be used as the other comonomer unit include units derived from trimellitic acid, pyromellitic acid, trimesic acid, trimethylol propane, pentaerythritol, and their ester-forming derivatives. These can increase melt tension through the addition of a small amount thereof and can be used to adjust melt-formability. The content of the polyfunctional compound unit in the polyester is preferably 1 mol % or less, and more preferably 0.5 mol % or less. If the content of the polyfunctional compound unit is more than 1 mol %, gelation is undesirably prone to occur, so that it is not preferable.

Examples of the monofunctional compound unit having only one carboxyl group or hydroxyl group to be used as the other comonomer unit include units derived from benzoic acid, 2,4,6-trimethoxybenzoic acid, 2-naphthoic acid, stearic acid, and stearyl alcohol. These function as capping monomer units and undergo capping of a molecular chain end in the polyester, and therefore they are sometimes incorporated to prevent excessive crosslinking and generation of gels in the polyester. The content of the monofunctional compound unit in the polyester is preferably 1 mol % or less, and more preferably 0.5 mol % or less. If the proportion of the monofunctional compound unit is more than 1 mol %, this will lead to a reduced polymerization rate in the production of the polyester and productivity is prone to be lowered.

Preferred as a method for producing the polyester is a method including melt-polycondensing 2,5-furandicarboxylic acid or an ester-forming derivative thereof and at least one selected from the group consisting of ethylene glycol, 1,3-propanediol, and 1,4-butanediol while, if necessary, adding another comonomer having 5 or more carbon atoms, or the like, or a method further including performing solid phase polymerization subsequent to the melt -polycondensation.

A method for performing the melt-polycondensation will be described below. First, 2,5-furandicarboxylic acid or an ester-forming derivative thereof and at least one selected from the group consisting of ethylene glycol, 1,3-propanediol, and 1,4-butanediol are heated to allow an esterification reaction or a transesterification reaction to proceed, thereby obtaining an oligomer. At this time, the oligomer may be obtained by adding beforehand the other comonomer having 5 or more carbon atoms and concurrently allowing the esterification reaction or the transesterification reaction to proceed, or alternatively the oligomer may be first obtained and then subjected to the melt-polycondensation reaction with addition of the other comonomer having 5 or more carbon atoms. The esterification reaction or the transesterification reaction is preferably performed, while distilling off water or an alcohol to be generated, at a temperature of 180 to 300° C. under an increased pressure of about 0.3 MPa or less in absolute pressure or under normal pressure. The ratio of the raw materials to be used in the esterification reaction or the transesterification reaction is preferably adjusted such that the molar ratio (diol component/ dicarboxylic acid component) is within a range of 1.1 to 2.5.

The melt-polycondensation reaction subsequent to the esterification reaction or the transesterification reaction is preferably performed by adding, if necessary, the aforementioned raw materials, a polycondensation catalyst, and an additive such as a coloring inhibitor to the obtained polyester oligomer under a pressure reduced by 1 kPa or less at a temperature of 200 to 300° C. until a polyester having a desired viscosity is obtained. The melt-polycondensation reaction can be performed using a vessel type batch polycondensation apparatus or a continuous polycondensation apparatus composed of a biaxial rotary horizontal reactor, for example.

When a polycondensation catalyst is used in the above-described melt -polycondensation reaction, preferred is a compound containing germanium element, antimony element, or titanium element. As the compound containing antimony element, antimony trioxide, antimony chloride, antimony acetate, or the like is used. As the compound containing germanium element, germanium dioxide, germanium tetrachloride, germanium tetraethoxide, or the like is used. As the compound containing titanium element, organic titanium compounds such as tetraisopropyl titanate and tetrabutyl titanate, and inorganic titanium compounds such as titanium oxide and composite particles of hydrotalcite with titanium dioxide are used. When a polycondensation catalyst is used, the amount thereof to be added is preferably within a range of 0.002 to 0.8 mass % based on the mass of the dicarboxylic acid component.

When a coloring inhibitor is used in the above-described melt -polycondensation reaction, phosphorus compounds such as phosphorous acid, phosphoric acid, trimethyl phosphite, triphenyl phosphite, tridecyl phosphite, trimethyl phosphate, tridecyl phosphate, and triphenyl phosphate can be used. These phosphorus compounds may be used singly or alternatively two or more of them may be used in combination. When a coloring inhibitor composed of the aforementioned phosphorus compound is used, the amount thereof is preferably within a range of 0.001 to 0.5 mass % based on the mass of the dicarboxylic acid component. To suppress coloring due to thermal decomposition of the polyester, a cobalt compound, such as cobalt acetate, may be added in an amount of 0.001 to 0.5 mass % based on the mass of the dicarboxylic acid component.

The thus obtained polyester may be subjected to the production of a film, or the obtained polyester may be further subjected to solid phase polymerization in the following manner. By performing the solid phase polymerization, it is possible to obtain a polyester with a higher degree of polymerization. The polyester to be subjected to the solid phase polymerization preferably has an intrinsic viscosity within a range of 0.4 to 0.85 dl/g. The polyester resulting from the melt-polycondensation is extruded into a shape such as strand or sheet, the extruded polyester is cooled, and then cut with a strand cutter, a sheet cutter, or the like, and thus intermediate pellets each with a shape such as a cylindrical shape, an elliptic cylindrical shape, a disc-like shape, or a dice-like shape are produced. The cooling after the extrusion can be performed by a water cooling method using a water bath, a method using a cooling drum, an air cooling method, or the like.

The thus obtained intermediate pellets are subjected to the solid phase polymerization; however, the pellets are preferably crystallized beforehand by heating before the solid phase polymerization. This makes it possible to prevent the pellets from agglutinating during the solid phase polymerization. The crystallization temperature is preferably 100 to 180° C. As a method for the crystallization, the crystallization may be performed in a vacuum tumbler or the crystallization may be performed by heating in an air circulation type heating apparatus. The time required for the crystallization is usually about 30 minutes to 24 hours.

The temperature for the solid phase polymerization is preferably 170 to 250° C., and the time of the solid phase polymerization is usually about 5 to 70 hours. The catalyst used for the melt-polycondensation may be allowed to coexist during the solid phase polymerization. The solid phase polymerization is preferably performed under reduced pressure or in an inert gas such as nitrogen gas. It is preferable to perform the solid phase polymerization while moving the pellets by an appropriate method such as a rotary method or an air fluidized bed method so that agglutination among pellets may not occur. When the solid phase polymerization is performed under reduced pressure, the pressure is preferably 1 kPa or less. The polyester after the solid phase polymerization preferably has an intrinsic viscosity within a range of 0.8 to 1.3 dL/g.

The sealant film of the present invention may contain additives as long as the effect of the present invention is not impaired, and examples of such additives include coloring agents such as dyes and pigments, stabilizers such as ultraviolet-ray absorbers, antistatic agents, flame retardants, flame retarding aids, lubricants, plasticizers, inorganic fillers, inorganic laminar compounds, and organized inorganic laminar compounds. These may be added to the polyester at the time of film formation. The content of the additives in the sealant film is preferably 10 mass % or less, and more preferably 2 mass % or less.

The polyester to be used in the present invention preferably has a glass transition temperature (Tg) of 60 to 90° C., more preferably 70 to 90° C., and even more preferably 80 to 90° C. When the glass transition temperature is higher than 90° C., the fluidity of the polyester during heat sealing lowers, so that heat sealability at low temperatures may be impaired. On the other hand, when the glass transition temperature is lower than 60° C., sufficient sealing strength may not be obtained or flavor barrier properties may deteriorate.

Examples of a method for forming a film from the polyester include a method including extrusion-molding the polyester using a T-die method, an inflation method, or the like. The polyester to be used for extrusion molding preferably has an intrinsic viscosity within a range of 0.6 to 1.3 dl/g for the T-die method, and preferably has an intrinsic viscosity within a range of 0.8 to 1.3 dl/g for the inflation method. Examples of an extruder to be used for extrusion-molding the polyester include a single screw extruder, a twin screw extruder, a vent extruder, and a tandem extruder. The temperature of the polyester during extrusion molding is preferably adjusted to a temperature within a range of (the melting point of the polyester +10° C.) to (the melting point of polyester resin +80° C.). It is preferable to obtain an unstretched film by extruding the polyester having been melted into a film shape and then rapidly solidifying the polyester with a film shape with use of a cooling drum. This suppresses the crystallization of the polyester in the obtained film. The temperature of the cooling drum is preferably adjusted to a temperature within a range of (the glass transition point of the polyester −30° C.) to (the glass transition point of the polyester +10° C.). Scraps such as trims generated during film production can be collected and reused.

Examples of a method for stretching the thus obtained unstretched film include a tenter stretching method, a tubular stretching method, and a roll stretching method. The temperature to be applied during stretching is preferably adjusted to a temperature of (the glass transition point of the polyester +5° C.) to (the glass transition point of the polyester +40° C.).

The sealant film of the present invention is preferably a stretched film having a uniaxial stretching ratio of 1.1 to 4.5. When the sealant film is a stretched film having a uniaxial stretching ratio of 1.1 to 4.5, it is possible to enhance mechanical properties, especially tensile elongation, while maintaining superior heat sealability and gas barrier properties. When the uniaxial stretching ratio is less than 1.1, the tensile elongation may be insufficient. The uniaxial stretching ratio is preferably 1.5 or more. On the other hand, when the uniaxial stretching ratio is more than 4.5, the tensile elongation or heat sealability may be insufficient. The uniaxial stretching ratio is preferably 3.5 or less, and more preferably 2.5 or less.

A method is also preferable in which a film is obtained by extrusion-molding the polyester, and then the film is biaxially stretched, thereby obtaining a stretched film. The biaxial stretching may be either simultaneous biaxial stretching or sequential biaxial stretching. The area stretching ratio in biaxial stretching is preferably 1.1 to 9.0. When the area stretching ratio is less than 1.1, the tensile elongation may be insufficient. The area stretching ratio is preferably 1.5 or more. On the other hand, when the area stretching ratio is more than 9.0, the tensile elongation or heat sealability may be insufficient. The area stretching ratio is preferably 7 or less, and more preferably 5 or less.

The stretched film obtained may be further subjected to heat treatment (heat setting). If the heat shrinkage ratio of the stretched film is excessively high, the film may be difficult to be handled depending on its application. In such a case, the heat shrinkage ratio can be reduced by heat-treating the stretched film at a temperature higher than the stretching temperature. The heat treating temperature to be applied at this time is preferably 120° C. or lower.

The sealant film of the present invention is required to be a stretched film that exhibits a shrinkage ratio of 6% or more in the maximum shrinkage direction upon being allowed to stand at 125° C. for 20 seconds. Usually, the shrinkage ratio increases as the film is stretched. In the present invention, the film is required to be stretched such that the shrinkage ratio becomes 6% or more. By stretching the film such that the shrinkage ratio becomes 6% or more, it is possible to enhance mechanical properties, especially tensile elongation, while maintaining superior heat sealability and gas barrier properties. The shrinkage ratio is preferably 10% or more, and more preferably 15% or more. From the viewpoint of obtaining a sealant film having particularly high mechanical properties, the shrinkage ratio is more preferably 30% or more. On the other hand, from the viewpoint of handleability of the sealant film, the shrinkage ratio is preferably 70% or less, and more preferably 65% or less. From the viewpoint of obtaining a sealant film having particularly improved handleability, the heat shrinkage ratio is preferably 50% or less, and more preferably 48% or less. The shrinkage ratio is determined by the following method. A sealant film is cut into an 80 mm square, and the flow direction and stretching direction during film formation are marked on the film. The sealant film is subjected to heat treatment by being allowed to stand at 125° C. for 20 seconds. The shrinkage ratio in the direction along which a higher shrinkage ratio of the film is exhibited at this time is defined as a shrinkage ratio in the maximum shrinkage direction. Usually, since the stretching ratio in the flow direction (MD) during film formation is the highest, the MD is taken as the maximum shrinkage direction, but in those instances where the film has been biaxially stretched such that the stretching ratio in the transverse direction (TD) would be the highest, the TD can be the maximum shrinkage directions. When the MD or stretching direction of the sealant film is unknown, the maximum shrinkage direction is confirmed beforehand by heat-treating the sealant film cut into a round shape, and then the shrinkage ratio can be determined by the above-described method.

From the viewpoint of well enhancing handleability as the sealant film, the shrinkage ratio in a direction perpendicular to the maximum shrinkage direction exhibited upon the sealant film of the present invention being allowed to stand at 125° C. for 20 seconds is preferably less than 10%, and more preferably 5% or less.

The sealant film of the present invention is required to have a crystallinity of less than 14%. The crystallinity of the sealant film as used herein is the crystallinity of the polyester in the stretched film. When the crystallinity is 14% or more, the tensile elongation and the heat sealability will be insufficient. The crystallinity is preferably 10% or less, and more preferably 8% or less. The crystallinity may be 0% or more. The polyester in the sealant film of the present invention preferably has an intrinsic viscosity within a range of 0.5 to 1.3 dl/g.

In the present invention, the tensile elongation of the sealant film measured by performing a tensile test under conditions of a temperature of 23° C., a relative humidity of 65%, and a tensile rate of 50 mm/min is preferably 130% or more. At this time, the tensile elongation may be 130% or more in at least one direction along the sealant film. The sealant film having such a tensile elongation is suitably used as an innermost layer of various packaging materials, and the like. The tensile elongation is more preferably 200% or more, and even more preferably 250% or more.

The sealant film of the present invention is superior in mechanical properties, especially tensile elongation, and also superior in heat sealability, non-adsorptivity, and gas barrier properties. Therefore, the sealant film is used suitably as, for example, an innermost layer of a packaging material for foods, beverages, chemicals, cosmetics, and medical instruments, and the like. While the sealant film of the present invention has at least a layer formed of the polyester as a superficial layer, the sealant film has a thickness of usually 20 to 80 µm when it is used as a monolayer packaging material. When the sealant film of the present invention is used as an innermost layer of a multilayer packaging material, the sealant film has a thickness of usually 3 to 20 µm. At this time, other layers to be laminated with the layer formed of the polyester to be used in the present invention may be paper, resin films other than the sealant film, metal sheets, or the like. In particular, from the viewpoint of reducing cost and adjusting elastic modulus, a preferred embodiment of the present invention is a multilayer film that includes the other layer made of a polyester other than the above-described polyester to be used in the present invention and in which the above-described polyester to be used in the present invention and the other layer are co-extruded and co-stretched. As the other polyester, polyethylene terephthalate, polyethylene terephthalate/isophthalate copolymer, polyethylene-cyclohexanedimethylene-terephthalate copolymer, a dry blend of polyethylene terephthalate or polyethylene terephthalate isophthalate copolymer with polyethylene furanoate, and the like are preferably used. As a method of co-extrusion molding, methods that are the same as those described in the section of the extrusion molding can be employed. As a method of co-stretching, methods that are the same as those described in the section of the method for stretching the unstretched film can be employed.

EXAMPLES

Hereafter, the present invention will be described in more detail with reference to examples, but the present invention is not limited to these examples at all.
(1) Intrinsic Viscosity (IV)

The intrinsic viscosity of a polyester was measured at a temperature of 30° C. using an equal mass mixture of phenol and 1,1,2,2-tetrachloroethane as a solvent.
(2) Glass Transition Temperature (Tg)

The glass transition temperature (Tg) of a polyester was measured using a differential scanning calorimeter (Model TA Q2000 manufactured by TA Instruments). The glass transition temperature (Tg) was calculated from the data taken during a course of heating the polyester to 280° C. at a temperature raising rate of 10° C./min, then cooling rapidly to 30° C. at −50° C./min, and then heating again at a temperature raising rate of 10° C./min.
(3) Crystallinity ($\chi$)

The crystallinity ($\chi$) of a polyester in a film was determined using the aforementioned differential scanning calorimeter. By heating the polyester film at a temperature raising rate of 10° C./min, a melting enthalpy ($\Delta Hm$ (J/g)) and a crystalization enthalpy $\Delta Hc$ (J/g) were measured. Using the measured $\Delta Hm$ and the $\Delta Hc$ as well as a heat of fusion of a perfect crystal body of the polyester [140.1 (J/g)], the crystallinity $\chi$ (%) was calculated from the following formula.

$$\chi\ (\%) = [(\Delta Hm - \Delta Hc)/140.1] \times 100$$

(4) Heat Shrinkage Ratio

A 40 to 60 µm-thick sealant film was cut into a 80 mm square, and the flow direction (MD) and the stretching direction during film formation were marked on the cut film. The film was allowed to stand for 20 seconds in a thermostatic device kept at 125° C., and then the shrinkage ratio in the maximum shrinkage direction was determined.

(5) Tensile Test

A 40 to 60 μm-thick sealant film was cut into a strip having a length of 100 mm and a width of 15 mm such that the flow direction (MD) during film formation was aligned with the longitudinal direction, and thus a specimen was obtained. A tensile test for the specimen was performed at a temperature of 23° C., a relative humidity of 65%, and a tensile rate of 50 mm/min by using an Autograph (manufactured by Shimadzu Corporation), and thus a tensile strength, a Young's modulus, and a tensile elongation (an elongation at break) of the sealant film in the flow direction (MD) thereof were measured.

(6) Heat Seal Test

Two sheets of 40 to 60 μm-thick sealant film cut in 15 mm wide strips were stacked on each other and heat-sealed at a temperature condition of 70 to 150° C. (10° C. intervals) at 0.2 MPa for 2 seconds using a YSS type heat sealer (manufactured by Yasuda Seiki Seisakusho, Ltd.), and thus samples that were heat-sealed at different temperatures were prepared. Each of the samples was subjected to a peeling test at a tensile rate of 50 mm/min by using an Autograph (manufactured by Shimadzu Corporation), and thus a peel strength (180° peel) required for peeling the two films was measured. The sealing temperature applied when the peel strength was 5.0 N/15 mm or more was defined as a heat sealable temperature. In the case where a peel strength of 5.0 N/15 mm or more was not attained even when heat sealing was performed at 150° C., the temperature was defined as "not heat sealable".

(7) Oxygen Permeability

The oxygen permeability was measured using an oxygen permeation measuring device ("MOCON OX-TRAN2/20" manufactured by Modern Controls, Inc.). Specifically, a film was mounted on the measuring device and then was subjected to the measurement at a temperature of 20° C. and a humidity of 65% RH.

Example 1

(1) Melt-Polycondensation

A slurry composed of 100 parts by mass of 2,5-furandicarboxylic acid (FDCA), 47.7 parts by mass of ethylene glycol (EG), 0.012 parts by mass of germanium dioxide (GeO$_2$), and 0.012 parts by mass of phosphorous acid was prepared. Then, the slurry was subjected to an esterification reaction by heating at 190° C. under pressure (gauge pressure of 0.25 MPa) while being fed into an esterification vessel over 2 hours, and thus an oligomer was produced. The obtained oligomer was transferred to a polycondensation vessel and then was subjected to melt-polycondensation at 0.1 kPa and 270° C. for 120 minutes, and thus a copolymerized polyester having an intrinsic viscosity of 0.7 dL/g was obtained. The obtained copolymerized polyester was extruded through a nozzle into a strand form, cooled in warm water at 30° C., and then cut into a cylindrical shape (about 2.5 mm in diameter, about 2.5 mm in length), and thus pellets of the copolymerized polyester (melt-polymerized pellets) were obtained.

(2) Preliminary Crystallization of Melt-Polymerized Pellets

The melt-polymerized pellets obtained as described above were charged into a rotary-type vacuum solid phase polymerization device and were subjected to preliminary crystallization at 0.1 kPa and 130 to 140° C. for 3 hours.

(3) Solid Phase Polymerization

After the preliminary crystallization, temperature was raised and the pellets were subjected to solid phase polymerization at 0.1 kPa and 190 to 200° C. for 100 hours, and thus solid phase-polymerized pellets were obtained. The obtained copolymerized polyester had an intrinsic viscosity of 0.9 dL/g. The ratios of the monomer components constituting the obtained polyester were examined by $^1$H-NMR spectrum (instrument: "JNM-GX-500 type" manufactured by JEOL Ltd., solvent: deuterated trifluoroacetic acid) and were found to be 2,5-furandicarboxylic acid unit:ethylene glycol unit:diethylene glycol unit=50: 48.75:1.25 (molar ratio). The obtained copolymerized polyester had a glass transition temperature (Tg) of 87° C. The ratios of the monomer units constituting the polyester and the glass transition temperature are unchanged before and after the solid phase polymerization.

(4) Preparation of Film

The obtained solid phase-polymerized pellets were dried overnight in a dryer at 120° C., then uniaxially kneaded (cylinder temperature: 260 to 280° C.), and then extruded through a T-die onto a cooling roll at 85° C. to prepare an unstretched film having a thickness of 100 μm and a width of 300 mm. The obtained unstretched film was cut into a 100 mm square, gripped at its four corners, and subjected to pantograph uniaxial stretching [stretching ratio: 2, stretching direction: flow direction (MD) during film formation] at 95° C. The obtained stretched film was subjected to measurement of intrinsic viscosity, measurement of crystallinity, measurement of heat shrinkage ratio, a tensile test, a heat seal test, and measurement of oxygen permeability. The results are shown in Table 1. The maximum shrinkage direction taken in the heat shrinkage ratio measurement was the stretching direction (the flow direction during film formation). The heat shrinkage ratio in the transverse direction (TD) is also shown in Table 1.

Example 2

A slurry composed of 48.5 parts by mass of 2,5-furandicarboxylic acid, 51.5 parts by mass of terephthalic acid, 46.25 parts by mass of ethylene glycol, 0.012 parts by mass of germanium dioxide (GeO$_2$), and 0.012 parts by mass of phosphorous acid was subjected to an esterification reaction by heating at 220° C. under pressure (gauge pressure of 0.25 MPa) while being fed into an esterification vessel over 2 hours, and thus an oligomer was produced. The obtained oligomer was transferred to a polycondensation vessel and then was subjected to melt-polycondensation at 0.1 kPa and 270° C. for 200 minutes, and thus a copolymerized polyester having an intrinsic viscosity of 0.9 dL/g was obtained. The obtained copolymerized polyester was extruded through a nozzle into a strand form, cooled in warm water at 30° C., and then cut into a cylindrical shape (about 2.5 mm in diameter, about 2.5 mm in length), and thus pellets of the copolymerized polyester (melt-polymerized pellets) were obtained. The ratios of the monomer components constituting the copolymerized polyester were examined in the same manner as in Example 1 and were found to be 2,5-furandicarboxylic acid unit:terephthalic acid unit:ethylene glycol unit:diethylene glycol unit=25:25:48.75:1.25 (molar ratio). The obtained copolymerized polyester had a glass transition temperature (Tg) of 83° C. A stretched film was prepared and evaluated in the same manner as in Example 1 except that the obtained copolymerized polyester was used and pellets dried under a vacuum of 0.1 kPa at 75° C. for 2 days during film formation were used. The results are shown in Table 1. The maximum shrinkage direction taken in the heat shrinkage ratio measurement was the stretching direction (the flow direction during film formation).

Example 3

Melt-polymerized pellets were obtained in the same manner as in Example 2 except that a slurry composed of 48.5 parts by mass of 2,5-furandicarboxylic acid, 51.5 parts by mass of isophthalic acid, 46.25 parts by mass of ethylene glycol, 0.012 parts by mass of germanium dioxide ($GeO_2$), and 0.012 parts by mass of phosphorous acid was used. The thus-obtained copolymerized polyester had an intrinsic viscosity of 0.8 dL/g. The ratios of the monomer components constituting the copolymerized polyester were examined in the same manner as in Example 1 and were found to be 2,5-furandicarboxylic acid unit:isophthalic acid unit:ethylene glycol unit:diethylene glycol unit=25:25:48.75:1.25 (molar ratio). The obtained copolymerized polyester had a glass transition temperature (Tg) of 80° C. A stretched film was prepared and evaluated in the same manner as in Example 2 except that the obtained copolymerized polyester was used. The results are shown in Table 1. The maximum shrinkage direction taken in the heat shrinkage ratio measurement was the stretching direction (the flow direction during film formation).

Example 4

Melt-polymerized pellets were obtained in the same manner as in Example 1. The thus-obtained copolymerized polyester had an intrinsic viscosity of 0.7 dL/g. The ratios of the monomer components constituting the copolymerized polyester were examined in the same manner as in Example 1 and were found to be 2,5-furandicarboxylic acid unit: ethylene glycol unit: diethylene glycol unit=50:48.75:1.25 (molar ratio). The obtained copolymerized polyester had a glass transition temperature (Tg) of 87° C. A stretched film was prepared and evaluated in the same manner as in Example 2 except that the obtained copolymerized polyester was used and pellets dried under a vacuum of 0.1 kPa at 75° C. for 2 days during film formation were used. The results are shown in Table 1. The maximum shrinkage direction taken in the heat shrinkage ratio measurement was the stretching direction (the flow direction during film formation).

Example 5

A stretched film was prepared and evaluated in the same manner as in Example 1 except that the film was stretched and subsequently heat-treated at 110° C. for 1 minute. The results are shown in Table 1. The maximum shrinkage direction taken in the heat shrinkage ratio measurement was the stretching direction (the flow direction during film formation).

Example 6

Solid phase-polymerized pellets were obtained in the same manner as in Example 1 except that a slurry composed of 100 parts by mass of 2,5-furandicarboxylic acid, 45.3 parts by mass of ethylene glycol, 10.1 parts by mass of bisphenol A-ethylene oxide adduct (EOBPA), 0.012 parts by mass of germanium dioxide ($GeO_2$), and 0.012 parts by mass of phosphorous acid was used, and the solid phase polymerization time was changed to 200 hours. The thus-obtained copolymerized polyester had an intrinsic viscosity of 1.2 dL/g.

The ratios of the monomer components constituting the copolymerized polyester were examined in the same manner as in Example 1 and were found to be 2,5-furandicarboxylic acid unit:ethylene glycol unit:unit derived from bisphenol A-ethylene oxide adduct:diethylene glycol unit=50:46.25: 2.5: 1.25 (molar ratio). The obtained polyester had a glass transition temperature (Tg) of 87° C. A stretched film was produced and evaluated in the same manner as in Example 1 except that the obtained copolymerized polyester was used. The results are shown in Table 1. The maximum shrinkage direction taken in the heat shrinkage ratio measurement was the stretching direction (the flow direction during film formation).

Example 7

Melt-polymerized pellets were obtained in the same manner as in Example 2 except that a slurry composed of 100 parts by mass of 2,5-furandicarboxylic acid, 37.1 parts by mass of 1,4-cyclohexanedimethanol (CHDM), 31.9 parts by mass of ethylene glycol, 0.012 parts by mass of germanium dioxide ($GeO_2$), and 0.012 parts by mass of phosphorous acid was used, and solid phase polymerization was not performed. The thus-obtained copolymerized polyester had an intrinsic viscosity of 0.75 dL/g. The ratios of the monomer components constituting the copolymerized polyester were examined in the same manner as in Example 1 and were found to be 2,5-furandicarboxylic acid unit:CHDM unit:ethylene glycol unit:diethylene glycol unit =50:16.5: 32.0:1.5 (molar ratio). The obtained polyester had a glass transition temperature (Tg) of 84° C. A stretched film was produced and evaluated in the same manner as in Example 2 except that the obtained copolymerized polyester was used and the cylinder temperature during extrusion was changed to 240 to 260° C. The results are shown in Table 1. The maximum shrinkage direction taken in the heat shrinkage ratio measurement was the stretching direction (the flow direction during film formation).

Example 8

A stretched film was prepared and evaluated in the same manner as in Example 1 except that the film thickness during film formation was changed to 150 μm and the stretching ratio was changed to 3. The results are shown in Table 1. The maximum shrinkage direction taken in the heat shrinkage ratio measurement was the stretching direction (the flow direction during film formation).

Example 9

A stretched film was prepared and evaluated in the same manner as in Example 1 except that the film thickness during film formation was changed to 200 μm and the stretching operation was changed to pantograph biaxial stretching [stretching temperature: 95° C., stretching ratio: 2 in the flow direction (MD) and 2 in the transverse direction (TD)]. The results are shown in Table 1. The maximum shrinkage direction taken in the heat shrinkage ratio measurement was the flow direction during film formation.

Example 10

A stretched film was prepared and evaluated in the same manner as in Example 1 except that the method of preparing a stretched film was changed from uniaxial stretching by pantograph to a roll stretching method (preheating roll temperature: 90° C., stretching roll temperature: 95° C., heat setting roll temperature: 95° C., stretching ratio: 2). The results are shown in Table 2. The maximum shrinkage direction taken in the heat shrinkage ratio measurement was the stretching direction (the flow direction during film formation).

Example 11

A stretched film was prepared and evaluated in the same manner as in Example 10 except that the heat setting roll temperature was changed to 110° C. The results are shown in Table 2. The maximum shrinkage direction taken in the heat shrinkage ratio measurement was the stretching direction (the flow direction during film formation).

Example 12

Solid phase-polymerized pellets were obtained in the same manner as in Example 1 except that a slurry composed of 99.9 parts by mass of 2,5-furandicarboxylic acid, 0.1 parts by mass of trimellitic anhydride(TMA), 44.8 parts by mass of ethylene glycol, 0.012 parts by mass of germanium dioxide ($GeO_2$), and 0.012 parts by mass of phosphorous acid was used. The thus -obtained copolymerized polyester had an intrinsic viscosity of 0.9 dL/g. The ratios of the monomer components constituting the copolymerized polyester were examined in the same manner as in Example 1 and were found to be 2,5-furandicarboxylic acid unit:trimellitic acid unit:ethylene glycol unit:diethylene glycol unit =49.9:0.05:48.75:1.25 (molar ratio). The obtained copolymerized polyester had a glass transition temperature (Tg) of 87° C. A stretched film was prepared and evaluated in the same manner as in Example 10. The results are shown in Table 2. The maximum shrinkage direction taken in the heat shrinkage ratio measurement was the stretching direction (the flow direction during film formation).

Comparative Example 1

An unstretched film was obtained in the same manner as in Example 1 except that the film thickness during film formation was changed to 50 The obtained unstretched film was evaluated in the same manner as in Example 1. The results are shown in Table 1.

Comparative Example 2

A stretched film was prepared and evaluated in the same manner as in Example 5 except that the heat treatment temperature was changed to 140° C. The results are shown in Table 1. The maximum shrinkage direction taken in the heat shrinkage ratio measurement was the stretching direction (the flow direction during film formation).

Comparative Example 3

A stretched film was prepared and evaluated in the same manner as in Example 1 except that the film thickness during film formation was changed to 250 μm and the stretching ratio was changed to 5. The results are shown in Table 1. The maximum shrinkage direction taken in the heat shrinkage ratio measurement was the stretching direction (the flow direction during film formation).

Comparative Example 4

An unstretched film was prepared in the same manner as in Example 1 except that the sheet thickness during film formation was changed to 500 μm. A stretched film was prepared and evaluated in the same manner as in Example 1 except that the unstretched film was used and the stretching operation was changed to pantograph biaxial stretching [stretching temperature: 120° C., stretching ratio: 3.5 in the flow direction (MD) and 3.5 in the transverse direction (TD)], and heat treatment was performed at 170° C. for 2 minutes after the stretching. The results are shown in Table 1. The maximum shrinkage direction taken in the heat shrinkage ratio measurement was the flow direction during film formation.

Comparative Example 5

Melt-polymerized pellets were obtained in the same manner as in Example 1 except that a slurry composed of 100 parts by mass of terephthalic acid, 44.8 parts by mass of ethylene glycol, 0.012 parts by mass of germanium dioxide ($GeO_2$), and 0.012 parts by mass of phosphorous acid was used, the esterification temperature was changed to 250° C., polycondensation was performed at 280° C. for 90 minutes. The thus-obtained polyester had an intrinsic viscosity of 0.7 dL/g. The ratios of the monomer components constituting the polyester were examined in the same manner as in Example 1 and were found to be terephthalic acid unit: ethylene glycol unit:diethylene glycol unit =50:48.75:1.25 (molar ratio). The obtained polyester had a glass transition temperature (Tg) of 80° C. An unstretched film was prepared in the same manner as in Example 2 except that the obtained polyester was used. A stretched film was prepared and evaluated in the same manner as in Example 1 except that the unstretched film was used and the stretching temperature was changed to 85° C. The results are shown in Table 1. The maximum shrinkage direction taken in the heat shrinkage ratio measurement was the flow direction during film formation.

Example 13

(1) Melt-Polycondensation

A slurry composed of 85.0 parts by mass of terephthalic acid (TA), 15.0 parts by mass of isophthalic acid (IPA), and 44.8 parts by mass of ethylene glycol (EG) was prepared. The, the slurry was subjected to an esterification reaction by heating at 250° C. under pressure (gauge pressure of 0.25 MPa), and thus an oligomer was produced. The obtained oligomer was transferred to a polycondensation vessel, and then 0.012 parts by mass of germanium dioxide ($GeO_2$) and 0.012 parts by mass of phosphorous acid were added thereto. By performing melt-polycondensation at 0.1 kPa and 280° C. for 90 minutes, a copolymerized polyester having an intrinsic viscosity of 0.7 dL/g was obtained. The obtained copolymerized polyester was extruded through a nozzle into a strand form, cooled in water, and then cut into a cylindrical shape (about 2.5 mm in diameter, about 2.5 mm in length), and thus pellets of the copolymerized polyester (melt-polymerized pellets) were obtained.

(2) Preliminary Crystallization of Melt-Polymerized Pellets

The melt-polymerized pellets obtained as described above were charged into a rotary-type vacuum solid phase polymerization device and were subjected to preliminary crystallization at 0.1 kPa and 120° C. for 10 hours.

(3) Solid Phase Polymerization

After the preliminary crystallization, temperature was raised and the pellets were subjected to solid phase polymerization at 0.1 kPa and 185° C. for 20 hours, and thus solid phase-polymerized pellets (pellets A) were obtained. The obtained copolymerized polyester had an intrinsic viscosity of 0.9 dL/g. The ratios of the monomer components constituting the copolymerized polyester were examined in the same manner as in Example 1 and were found to be terephthalic acid unit:isophthalic acid unit:ethylene glycol unit: diethylene glycol unit=42.5:7.5:48.75:1.25 (molar ratio). The obtained copolymerized polyester had a glass transition temperature (Tg) of 75° C.

(4) Preparation of Film (Coextrusion)

The pellets A and the solid phase-polymerized pellets obtained in Example 1 (pellets B) were dried overnight in a dryer at 120° C. Then, a mixture of a 80 weight fraction of the pellets A and a 20 weight fraction of the pellets B was uniaxially kneaded in an extruder for a first layer (cylinder temperature: 260 to 280° C.), and the pellets B were uniaxially kneaded in an extruder for a second layer (cylinder temperature: 260 to 280° C.). Subsequently, the molten resins were made to flow together by a feedback, and then were extruded through a T-die onto a cooling roll at 85° C. such that the second layer came into contact with the cooling roll, and thus an unstretched coextruded film having a 80 μm-thick first layer, a 20-μm thick second layer, and a width of 300 mm was prepared. The obtained unstretched coextruded film was cut into a 100 mm square, gripped at its four corners, and subjected to pantograph uniaxial stretching [stretching ratio: 2, stretching direction: flow direction (MD) during film formation] at 95° C. The obtained stretched film was subjected to measurement of intrinsic viscosity, measurement of crystallinity, measurement of heat shrinkage ratio, a tensile test, a heat seal test, and measurement of oxygen permeability. The heat seal test was performed with the side of the second layer being taken as a heat sealing surface. The obtained stretched film had an intrinsic viscosity of 0.8 dL/g and a crystallinity of 0%. The stretched film had a heat shrinkage ratio of 26% in the stretching direction (the flow direction during film formation) and a heat shrinkage ratio of 2% in the transverse direction (TD). The maximum shrinkage direction taken in heat shrinkage ratio measurement was the stretching direction (the flow direction during film formation). As a result of the tensile test, it was found that the tensile strength in the flow direction (MD) was 72 MPa, the Young's modulus was 2.2 GPa, and the tensile elongation (elongation at break) was more than 300%. As a result of the heat seal test, the heat sealable temperature was 130° C. The obtained stretched film had an oxygen permeability of 40 cc/20 μm·m²·day·atm. The results are shown in Table 3.

TABLE 1

| | Polyester | | | | Production | | | Evaluation of sealant film |
|---|---|---|---|---|---|---|---|---|
| | Other monomer unit | | | | Stretching | | | |
| | Type | Content (mol %) | IV (dL/g) | Tg (° C.) | temperature (° C.) | Stretching ratio [1] | Heat setting | IV (dL/g) |
| Example 1 | None | — | 0.9 | 87 | 95 | 2x1 | — | 0.8 |
| Example 2 | TA | 25 | 0.9 | 83 | 95 | 2x1 | — | 0.8 |
| Example 3 | IPA | 25 | 0.8 | 80 | 95 | 2x1 | — | 0.7 |
| Example 4 | None | — | 0.7 | 87 | 95 | 2x1 | — | 0.6 |
| Example 5 | None | — | 0.9 | 87 | 95 | 2x1 | 110° C., 1 min | 0.8 |
| Example 6 | EOBPA | 2.5 | 1.2 | 87 | 95 | 2x1 | — | 1.1 |
| Example 7 | CHDM | 16.5 | 0.75 | 84 | 95 | 2x1 | — | 0.7 |
| Example 8 | None | — | 0.9 | 87 | 95 | 3x1 | — | 0.8 |
| Example 9 | None | — | 0.9 | 87 | 95 | 2x2 | — | 0.8 |
| Comparative Example 1 | None | — | 0.9 | 87 | 95 | — | — | 0.8 |
| Comparative Example 2 | None | — | 0.9 | 87 | 95 | 2x1 | 140° C., 1 min | 0.8 |
| Comparative Example 3 | None | — | 0.9 | 87 | 95 | 5x1 | — | 0.8 |
| Comparative Example 4 | None | — | 0.9 | 87 | 120 | 3.5x3.5 | 170° C., 2 min | 0.8 |
| Comparative Example 5 | (PET) | — | 0.7 | 80 | 85 | 2x1 | — | 0.6 |

| | Evaluation of sealant film | | | | | | |
|---|---|---|---|---|---|---|---|
| | X | Heat shrinkage ratio (%) | | Young's modulus | Tensile strength | Tensile elongation | Heat sealable temperature | Oxygen permeability (cc/20 μm · |
| | (%) | MD | TD | (GPa) | (MPa) | (%) | (° C.) | m² · day · atm) |
| Example 1 | 0 | 44 | −4 | 2.6 | 92 | >300 | 130 | 12 |
| Example 2 | 0 | 46 | −2 | 2.2 | 75 | >300 | 120 | 62 |
| Example 3 | 0 | 47 | −2 | 2.3 | 80 | >300 | 120 | 50 |
| Example 4 | 1 | 45 | 0 | 2.6 | 94 | >300 | 130 | 12 |
| Example 5 | 3 | 34 | 0 | 2.4 | 90 | >300 | 140 | 12 |
| Example 6 | 2 | 46 | −2 | 2.5 | 89 | >300 | 130 | 14 |
| Example 7 | 2 | 46 | 1 | 2.2 | 65 | >300 | 120 | 23 |
| Example 8 | 2 | 60 | −4 | 3.2 | 113 | 170 | 150 | 11 |
| Example 9 | 4 | 45 | 44 | 2.5 | 86 | 150 | 150 | 11 |

TABLE 1-continued

| | | | | | | | | |
|---|---|---|---|---|---|---|---|---|
| Comparative Example 1 | 0 | 2 | 0 | 2.7 | 100 | 4 | 130 | 12 |
| Comparative Example 2 | 4 | 3 | 2 | 2.6 | 88 | 4 | 140 | 12 |
| Comparative Example 3 | 15 | 75 | −6 | 3.9 | 130 | 120 | 2) | 10 |
| Comparative Example 4 | 35 | 3 | 2 | 3.7 | 130 | 40 | 2) | 10 |
| Comparative Example 5 | 17 | 47 | 2 | 2.2 | 63 | >300 | 140 | 106 |

1) (MD)x(TD)
2) Not heat sealable

TABLE 2

| | Polyester | | | | Production | | Evaluation of sealant film |
|---|---|---|---|---|---|---|---|
| | Other monomer unit | | | | Stretching | | Heat setting |
| | Type | Content (mol %) | IV (dL/g) | Tg (° C.) | Stretching temperature (° C.) | Stretching ratio [1] | roll temperature | IV (dL/g) |
| Example 10 | None | — | 0.9 | 87 | 95 | 2x1 | 95° C. | 0.8 |
| Example 11 | None | — | 0.9 | 87 | 95 | 2x1 | 110° C. | 0.8 |
| Example 12 | TMA | 0.1 | 0.9 | 87 | 95 | 2x1 | 95° C. | 0.8 |

| | | Evaluation of sealant film | | | | | |
|---|---|---|---|---|---|---|---|
| | X | Heat shrinkage ratio (%) | | Young's modulus | Tensile strength | Tensile elongation | Heat sealable temperature | Oxygen permeability (cc/20 μm · |
| | (%) | MD | TD | (GPa) | (MPa) | (%) | (° C.) | m² · day · atm) |
| Example 10 | 0 | 27 | −6 | 2.6 | 93 | >300 | 130 | 12 |
| Example 11 | 1 | 11 | −2 | 2.5 | 91 | >300 | 130 | 12 |
| Example 12 | 0 | 24 | −5 | 2.7 | 95 | >300 | 130 | 12 |

[1] (MD) X (TD)

TABLE 3

| | Polyester | | | | | Production | | | Evaluation of sealant film |
|---|---|---|---|---|---|---|---|---|---|
| | Composition of resin | | | | | Stretching | | | |
| | Type | Type | Content (mol %) | IV (dL/g) | Tg (° C.) | temperature (° C.) | Stretching ratio [1] | Heat setting | IV (dL/g) |
| Example 13 | Pellet A | None | — | 0.9 | 87 | 95 | 2x1 | None | 0.8 |
| | Pellet B | TA | 42.5 | 0.9 | 75 | | | | |
| | | IPA | 7.5 | | | | | | |

| | | Evaluation of sealant film | | | | | |
|---|---|---|---|---|---|---|---|
| | X | Heat shrinkage ratio (%) | | Young's modulus | Tensile strength | Tensile elongation | Heat sealable temperature | Oxygen permeability (cc/20 μm · |
| | (%) | MD | TD | (GPa) | (MPa) | (%) | (° C.) | m² · day · atm) |
| Example 13 | 0 | 26 | 2 | 2.2 | 72 | >300 | 130 | 40 |

[1] (MD) X (TD)

The invention claimed is:

1. A sealant film comprising at least a layer comprising a polyester as a superficial layer,
wherein
the polyester comprises 20 to 50 mol % of a 2,5-furandicarboxylic acid unit, 18 to 49.5 mol % of at least one diol unit selected from the group consisting of an ethylene glycol unit, a 1,3-propanediol unit, and a 1,4-butanediol unit, and 0.5 to 2.5 mol % of a diethylene glycol unit,
the sealant film has a crystallinity of less than 14%,
the sealant film is a stretched film that exhibits a shrinkage ratio of 6% or more in a maximum shrinkage direction upon being allowed to stand at 125° C. for 20 seconds,
the sealant film is a uniaxial stretched film having a uniaxial stretching ratio of 1.1 to 2.5, and
the sealant film exhibits a tensile elongation of more than 300% as measured by performing a tensile test under a condition defined by a temperature of 23° C., a relative humidity of 65%, and a tensile rate of 50 mm/min.

2. The sealant film according to claim 1, wherein the polyester further comprises 0.01 to 30 mol % of another comonomer unit having 5 or more carbon atoms.

3. The sealant film according to claim 1, wherein the sealant film has a uniaxial stretching ratio of 1.5 to 2.5.

4. The sealant film according to claim 1, wherein the sealant film has an area stretching ratio of 1.1 to 9.0.

5. A method for producing the sealant film according to claim 1, the method comprising:
extrusion-molding the polyester to obtain a film; and subsequently uniaxially stretching the film.

6. A method for producing the sealant film according to claim 1, the method comprising:
extrusion-molding the polyester to obtain a film; and subsequently biaxially stretching the film.

* * * * *